United States Patent [19]

Turner

[11] 3,929,018
[45] Dec. 30, 1975

[54] PROBE SYSTEM
[75] Inventor: Robert Bruce Turner, Weymouth, Mass.
[73] Assignee: American Medical Electronics Corporation, Weymouth, Mass.
[22] Filed: May 6, 1974
[21] Appl. No.: 467,222

[52] U.S. Cl. ............ 73/343 R; 73/359; 73/362 AR; 136/232; 206/306; 338/28
[51] Int. Cl.² ...................... G01K 1/16; G01K 7/16
[58] Field of Search .......... 73/343 R, 362 AR, 359; 206/306; 338/28; 136/232

[56] References Cited
UNITED STATES PATENTS

| | | | |
|---|---|---|---|
| 2,799,758 | 7/1957 | Hutchins | 73/362 AR |
| 3,254,533 | 6/1966 | Tongret | 73/362 AR |
| 3,738,479 | 6/1973 | Sato | 73/362 AR |

Primary Examiner—S. Clement Swisher
Assistant Examiner—Denis E. Corr
Attorney, Agent, or Firm—Joseph S. Iandiorio

[57] ABSTRACT

A disposable probe cover for a heat sensing probe system, which includes a probe member and a heat sensitive element sealingly engaged with and mounted on the probe member, the probe cover comprising a body section and a thermally conductive contact section sealingly engageable with the probe member for forming a thermal chamber, between the probe member and probe cover, including the contact section and heat sensing element spaced from each other, and a low thermal conductivity fluid medium for transferring heat from the contact section to the heat sensitive element.

6 Claims, 13 Drawing Figures

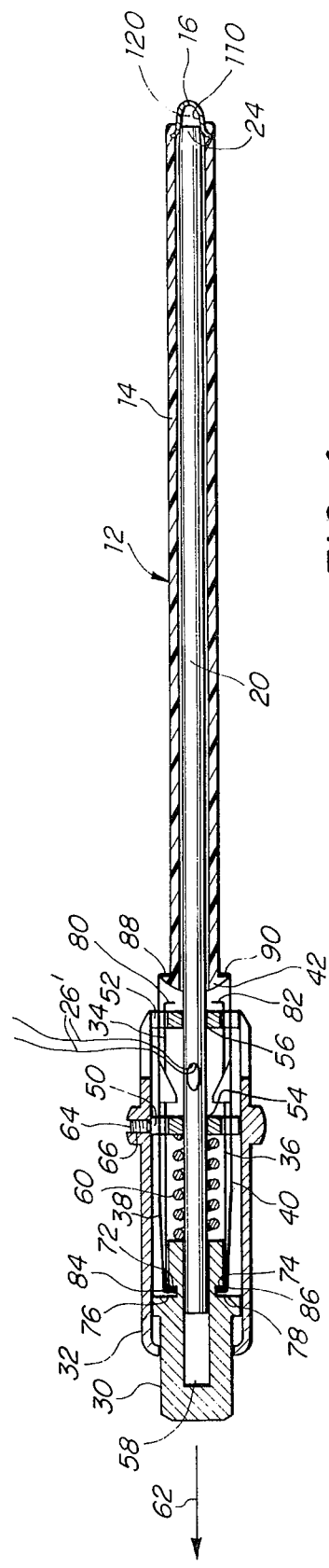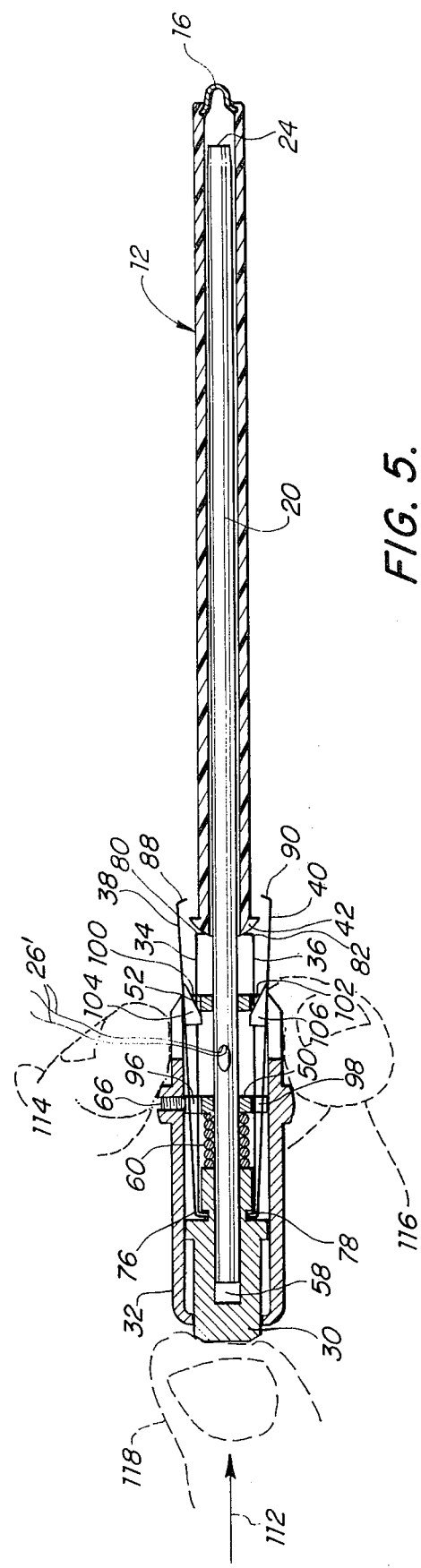

PROBE SYSTEM

FIELD OF INVENTION

This invention relates to a probe cover, probe cover holding mechanism and a heat sensing probe system including both, in which a thermal chamber created by the probe cover is used to transfer heat from the probe cover to the heat sensing element.

BACKGROUND OF INVENTION

Conventional heat sensing systems, such as those used to measure the body temperature of mammals, often use a heat sensing element which directly interacts with a portion of the body. In such systems the element is exposed and susceptible to damage. In another form the sensing element is mounted on a probe member which receives a disposable probe cover having a tip of metal or other thermally conductive material. Typically, the tip is large enough to provide a sufficient outer surface in the area exposed to the body to prevent discomfort to the patient. However, when made large to provide sufficient outer area, the resulting tips also have large mass and so absorb greater quantities of heat from the body being monitored, which may detract from the accuracy of the reading. The interface between the inner surface of the tip and the heat sensing element may also be a source of inaccuracy: the area of the inner surface actually in contact with the heat sensing element may vary from probe cover to probe cover and change the heat transfer characteristics e.g. thermal time constant of the interface. Consequently, the electronic circuits tuned to respond to a particular optimum thermal time constant, respond unevenly with changes in the contact between the tip and heat sensing element.

SUMMARY OF INVENTION

It is therefore an object of this invention to provide an improved probe cover for producing a positive, uniform, repeatable thermal time constant with each probe cover used.

It is also an object of this invention to provide an improved probe cover for producing faster response time and lower heat absorption while maintaining a relatively large outer surface area for contacting the body whose temperature is to be monitored.

It is a further object of this invention to provide a positive locking of the probe cover to, and ejection of the probe cover from, the probe member.

The invention results from the realization that a probe system having fast response time and low heat absorption, sufficient tip area, and positive uniform repeatable thermal time constant with each probe cover can be produced by providing a probe cover which produces a heat buffering zone or thermal chamber, between the probe member and probe cover, which thermal chamber includes the heat sensitive element and the tip or contact section of the probe cover spaced from each other in a low thermal conductivity fluid medium for transferring heat from the contact section to the heat sensitive element.

The invention features a disposable probe cover for a heat sensing probe system, which includes a probe member and a heat sensitive element sealingly engaged with and mounted on the probe member. The probe cover includes a body section and a thermally conductive tip or contact section sealingly interconnected with the body section. The probe cover is sealingly engageable with the probe member for forming a thermal chamber, between the probe member and probe cover. The thermal chamber includes the contact section and the heat sensing element in spaced relation and a low thermal conductivity fluid medium which transfers heat from the contact section to the heat sensitive element.

DISCLOSURE OF PREFERRED EMBODIMENT

Other objects, features and advantages will occur from the following description of a preferred embodiment and the accompanying drawings, in which:

FIG. 4 is a sectional view of the probe system shown in FIG. 3;

FIG. 5 is a sectional diagram similar to FIG. 4 showing the holding and ejection mechanism during an ejection operation;

Figure 1:
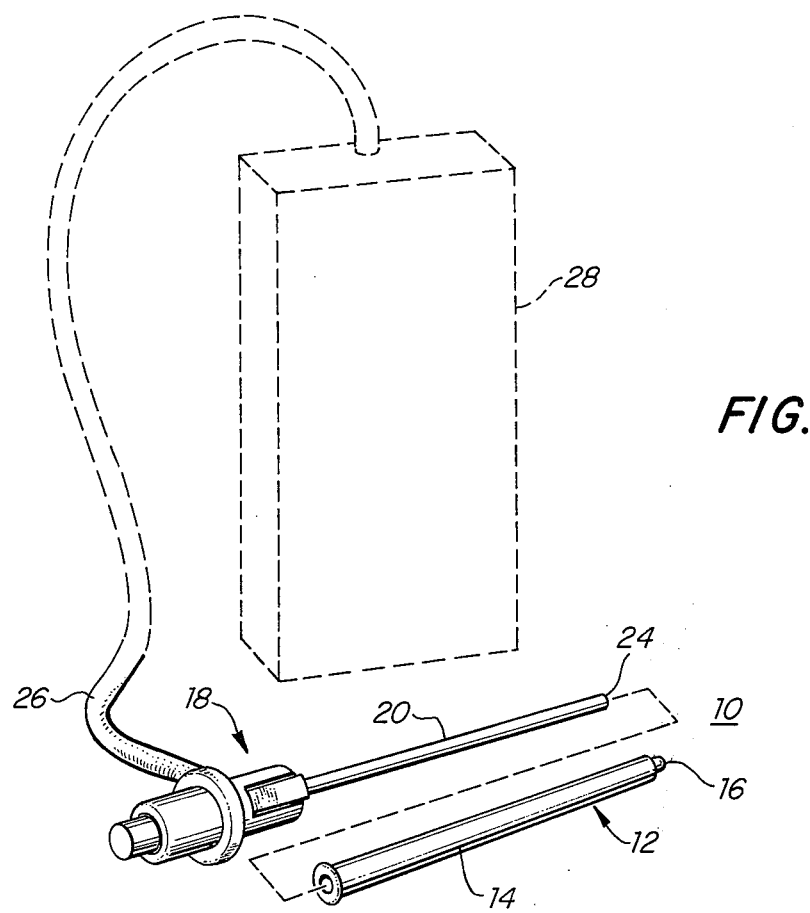
FIG. 1 is an axonometric diagram of a probe system according to this invention.

The invention may be accomplished using a disposable probe cover for a heat sensing probe system which includes a probe member and a heat sensing element sealingly engaged with and mounted on the probe member. The probe cover includes a body section and a thermally conductive contact section which is sealingly interconnected with the body section. The probe cover is sealingly engageable with the probe member for forming a thermal chamber between the probe member and probe cover. This sealing engagement between the probe cover and probe member and between the contact section and body section of the probe cover is designed to preserve the integrity of the thermal chamber. The thermal chamber includes the contact section and the heat sensing element in spaced relationship to each other and is filled with a low thermal conductivity fluid medium for transferring heat from the contact section to the heat sensitive element. The body section and contact section may be separate parts or they may be integral; in either case they are sealingly interconnected.

In some forms, such as where the probe cover has an elongate or tubular shape, the contact section may be commensurate with the end or tip of the probe cover. Either the contact section or the body section or both may contact the probe member to provide the seal between the probe cover and the probe member. In those embodiments in which the probe cover is elongate in shape the tip of the probe cover, which engages the end of the probe member, may be tapered gently on its inner surface to produce a wedging effect on the end of the probe member to increase the sealing force at the thermal chamber. Either the end of the probe member or the tip or both may be flexible.

In one probe system including such a disposable probe cover formed of an elongated tube, the tip of which constitutes a contact section, the tip may be formed of a high thermal conductivity material such as metal e.g. aluminum; the tip could alternatively be formed of a material having a relatively low thermal conductivity such as glass or the same material as the rest of the probe cover but made thin enough so that the effective thermal conductivity of the tip is sufficient. Also, the area of the tubular portion of the probe cover proximate the tip may be made of material such as polypropylene plastic having low thermal conductivity to prevent heat transfer through the rest of the probe cover but the remainder of it need not be so restricted. The probe cover holding mechanism includes a probe member which may be, for example, a hollow tube sized to fit inside the probe cover. At the end of the probe member there is a heat sensing element which may be recessed or protrude from the end of the probe member. The probe member extends from a housing that contains the holding and ejection mechanism. When the probe cover is properly installed on the probe member and gripped by the holding mechanism the end of the probe member fits snugly inside of the probe cover tip which is hollow and gently tapered. The gentle taper on the inner surface of the tip in combination with the flexibility of either the tip or the end of the probe member or both enables the probe member to tightly and positively contact the tip under the holding force of the holding mechanism. The heat sensing element at the end of the probe member is spaced from the tip at the end of the probe cover; and the hollow portion of the tip in conjunction with the end of the probe member form a thermal chamber in which a trapped fluid medium, such as air, acts to convey the heat from the tip, which is exposed to the body whose temperature is to be measured, to the heat sensing element mounted in the probe member. The positive engagement of the end of the probe member with the tip of the probe cover and the thermal chamber so formed provide a uniform and repeatable relationship between the tip and heat sensing element so that the thermal time constant of the heat sensing element remains the same with each probe cover used.

The holding mechanism may include an actuator, at least one locking element, and at least one ejection element. The biasing structure urges the actuator and elements in a rearward direction overcoming the bias to eject a used probe cover and accept a new one. There is a guide member for guiding the elements and actuator in their forward and rewarward movements and cam members for spreading the locking elements as they are moved forward against the force of the biasing structure and retracting those elements as they are moved rearwardly in the direction of the bias.

In one embodiment, FIG. 1, the heat sensing probe system 10 includes a disposable probe cover 12 having a plastic tubular body 14 sealingly interconnected with a hollow aluminum tip 16 which functions as the contact section. Probe system 10 also includes a probe holding and ejection mechanism 18 including a probe member, tube 20. Tube 20 may be a hollow metal tube in whose end 24 a heat sensing element is contained. Monitoring current is supplied to the heat sensing element through cable 26 which connects to the electronic thermometer circuit and display 28 shown in phantom.

Figure 2:
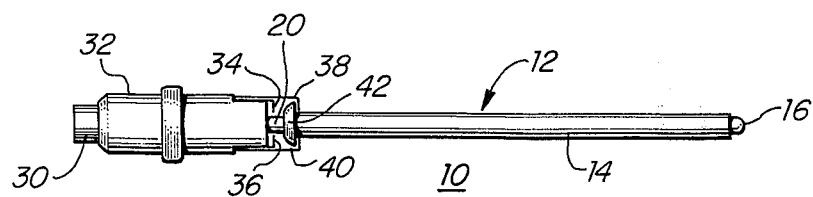
FIG. 2 is a side elevational view of the probe system of FIG. 1 with the probe cover installed.
Figure 3:
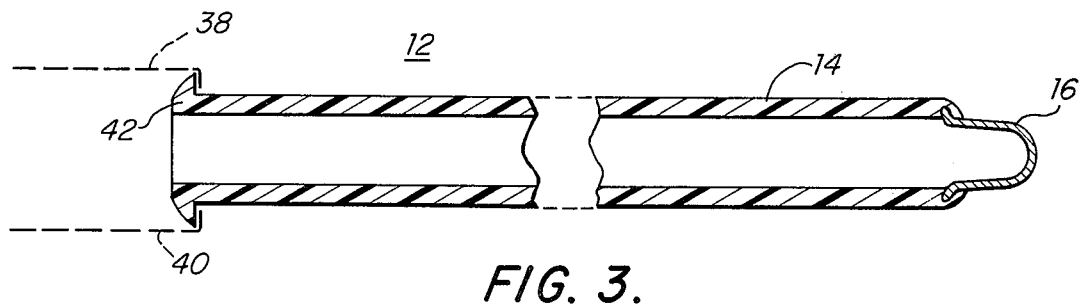
FIG. 3 is an enlarged sectional diagram of a probe cover according to this invention.

Probe holding and ejection mechanism 18 includes an actuator button 30, FIG. 2, slidably mounted in housing 32 to operate ejection elements 34, 36 and locking or holding elements 38 and 40 which grip probe cover 12 at its flanged end 42 illustrated more clearly in FIG. 3. When probe cover 12 is used with other holding and ejection mechanisms which do not require flange 42 for their operation that flange may be eliminated.

Figure 6:
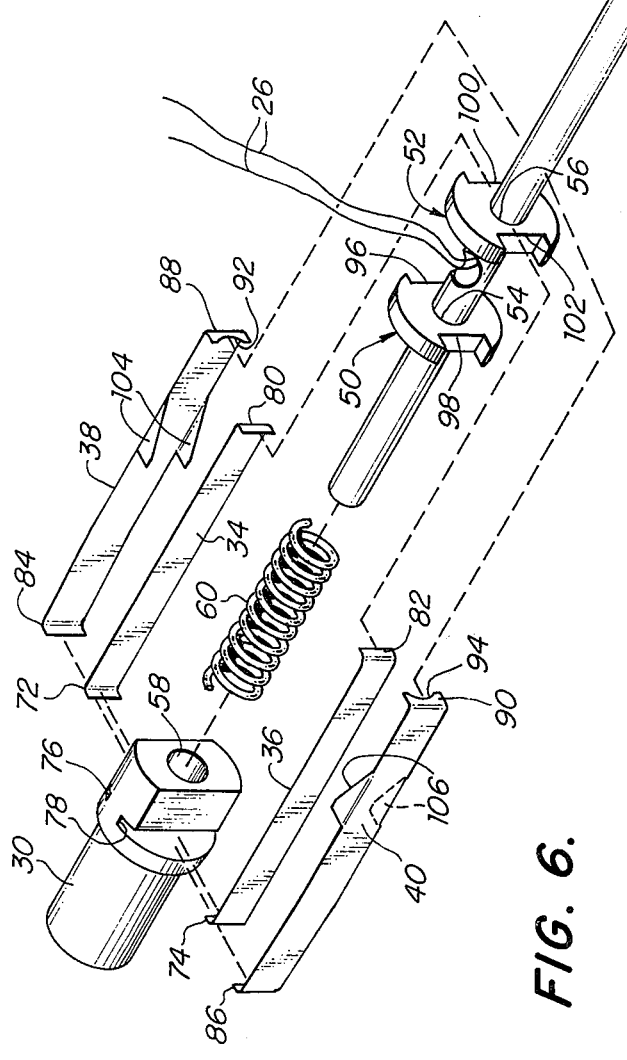
FIG. 6 is an enlarged, exploded, axonometric view with the housing removed, of portions of the holding and ejection mechanism shown in FIGS. 4 and 5.

As shown in more detail in FIGS. 4 and 6 holding and ejection mechanism 18 includes housing 32, actuator button 30, and discs 50 and 52 fixed to housing 32 at their peripheries and to probe member, tube 20, where it passes through their respective center holes 54 and 56. Tube 20 is slidably received in center bore 58 of actuator button 30 and a biasing spring 60 is mounted about tube 20 between disc 50 and button 30. Spring 60 exerts a biasing force on actuator button 30 in the direction indicated by arrow 62. Discs 50 and 52 may be fixed to tube 20 by means of an interference fit at holes 54 and 56, respectively, or through the use of adhesive cement or other fastening means. Discs 50 and 52 may be fixed to housing 32 by means of a set screw 64 mounted in threaded bore 66. Set screw 64 is tightened in bore 66 to bear on disc 50 and retain it in position. Disc 52 will thus also be maintained in fixed relationship to housing 32 since both discs 50 and 52 are fixed to tube 20. Wires 26' from cable 26 may enter tube 20 from a hole in housing 32.

The ejection elements 34 and 36 have rear detents 72, 74, FIG. 6, which engage with channels 76 and 78, respectively, in actuator 30. Forward detents 80, 82 are provided on ejection elements 34 and 36 for contacting the rear portion of probe cover 12 and ejecting it from tube 20. Holding elements 38 and 40 have rear detents 84, 86 which also are mounted in channels 76 and 78, respectively, and forward detents 88 and 90 which have arcuate gripping surfaces 92, 94, respectively, shaped to engage with the circumference of body 14 of probe cover 12. Disc 50 includes notches 96 and 98 which slidably receive and guide elements 34, 38 and elements 36 and 40, respectively, as they move with actuator 30 with and against the bias provided by spring 60. Similar notches 100 and 102 are provided in disc 52. Two camming members 104 are provided on element 38 and two camming members 106 are provided on element 40. Cam members 104 and 106 extend around elements 34 and 36, respectively, and in towards tube 20.

In operation, with probe cover 12 installed as shown in FIG. 4, the force exerted by spring 60 in the direction indicated by arrow 62 is applied through detents 88 and 90 of elements 34 and 36, respectively, to flange 42 of cover 12. This force is sufficient to sealingly engage the inner surface 110 of tip 16 with the outer periphery of end 24 of tube 20 so that a thermal zone 120 is formed between tip 16 and the end 24 of tube 20. To eject probe cover 12 after it is used, it is only necessary to apply a force in the direction of arrow 112, FIG. 5, to actuator button 30, for example, by gripping housing 32 between the index 114 and middle finger 116 and pressing on actuator 30 with thumb 118. This compresses spring 60 and moves actuator button 30 forward on tube 20 which is fixed by means of discs 50 and 52 in housing 32. The forward motion of actuator button 30 causes elements 34, 36, 38 and 40 to move forward guided by notches 96, 98, 100 and 102. The forward motion of members 38 and 40 causes cam members 104 and 106 to bear on notches 100 and 102 of disc 52 and spread apart the forward ends of elements 38 and 40 containing detents 88 and 90. This spreading action releases probe cover 12 so that it may be pushed off tube 20 by the ejection elements 34 and 36.

Figure 7:
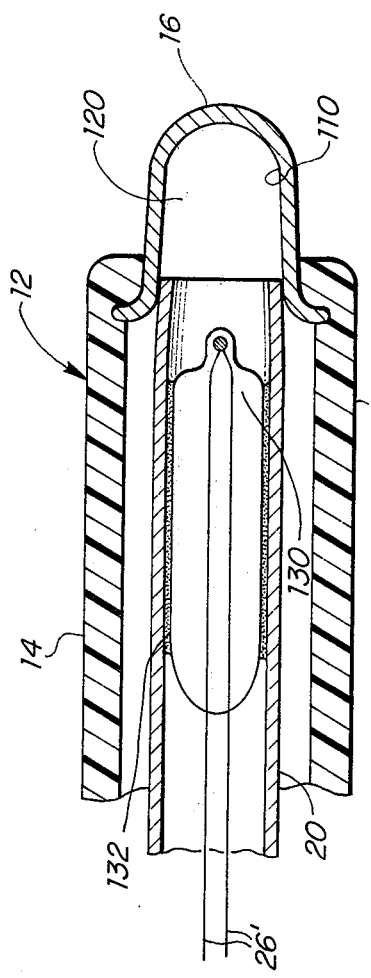
FIG. 7 is an enlarged, sectional diagram of a portion of a probe system depicting the thermal chamber formed between the probe cover and the end of the probe member according to the invention.
Figure 8:
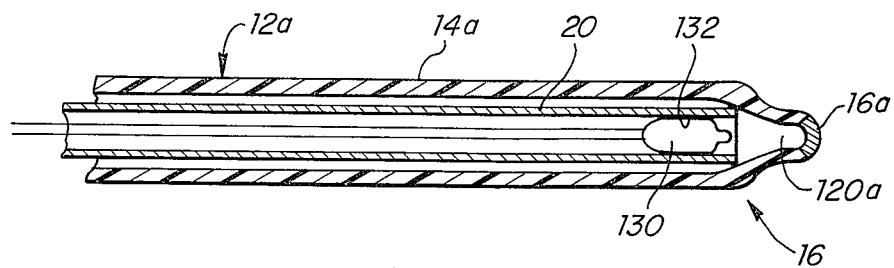
FIG. 8 is an enlarged, sectional diagram of a portion of an alternative form of probe cover according to this invention mounted on a probe member.

In accordance with the invention when probe cover 12 is properly mounted on the probe member, tube 20, FIG. 7, the end 24 of tube 20 tightly engages the tapered inner surface 110 of hollow tip 16. Preferably, either tip 16 or the end 24 of tube 20 or both are sufficiently resilient so that one or both of them will bend or flex slightly by virtue of the tapering contour of the inner surface 110 of tip 16. A temperature sensor 130 is electrically connected to wires 26' and is sealed to tube 20 by, for example, thermal insulating cement 132. A heat buffer zone or thermal chamber 120 is formed in the cavity created by the conjunction of hollow tip 16 and the end 24 of tube 20. Heat from a body to be measured flows through tip 16 and contacts the fluid medium, such as air, which is trapped in thermal chamber 120. The motion of the air in thermal chamber 120 causes the heated air proximate the tip 16 to come in contact with the heat sensing device 130 and quickly raise it to the temperature of tip 16 which quickly attains the temperature of the body being monitored.

Figure 9:
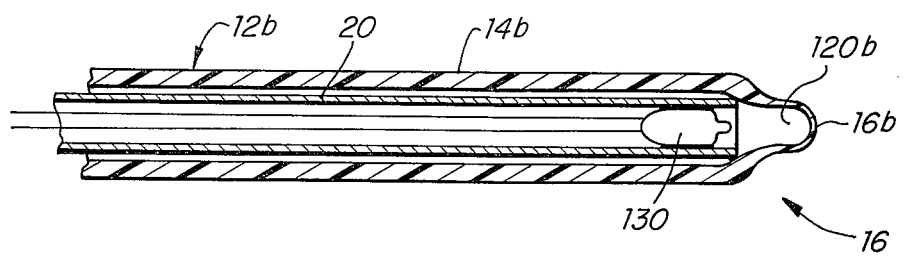
FIG. 9 is an enlarged, sectional diagram of a portion of another alternative form of probe cover according to this invention mounted on a probe member.
Figure 10:
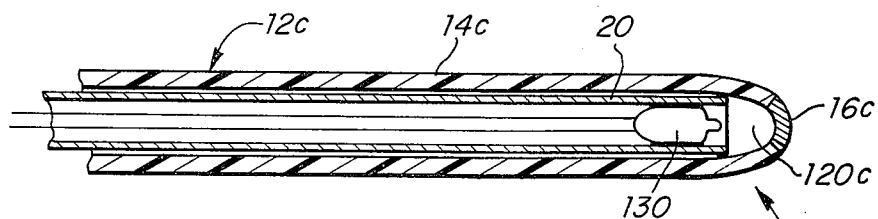
FIG. 10 is an enlarged, sectional diagram of a portion of another alternative form of probe cover according to this invention mounted on a probe member.
Figure 11:
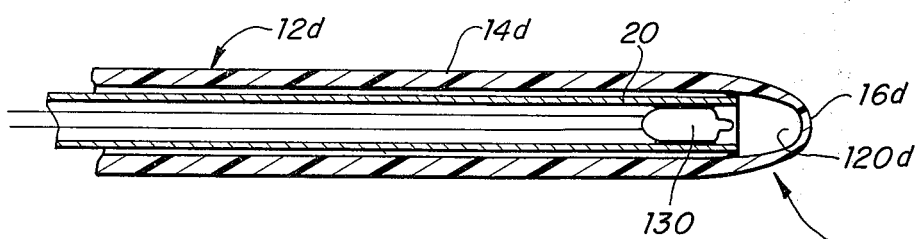
FIG. 11 is an enlarged, sectional diagram of a portion of another alternative form of probe cover according to this invention mounted on a probe member.
Figure 12:
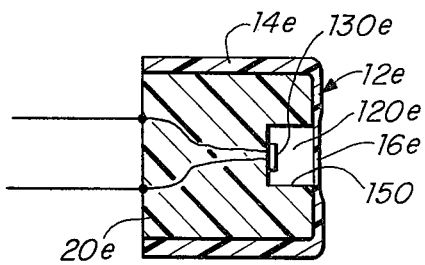
FIG. 12 is a side, sectional view of an alternative probe system and probe cover according to this invention.
Figure 13:
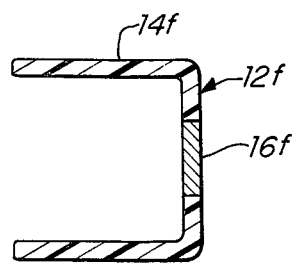
FIG. 13 is a sectional view of another alternative form of probe cover similar to that shown in FIG. 12.

Probe cover 12 in accordance with this invention is not restricted to the form shown in FIG. 3, as illustrated in FIGS. 8–13 wherein the parts have been given like numbers accompanied by lower case letters $a$, $b$, $c$, $d$, $e$ and $f$, respectively. For example, in FIG. 8, the tip and contact sections are no longer commensurate: contact section 16a occupies only a small portion of the tip 16 which is integral with and formed of the same material as body 14a while contact section 16a is formed of metal. In FIG. 9, contact section 16b and body section 14b are both formed of the same material; contact section 16b is a small portion of the tip 16 formed of a much thinner wall of the same material as the body section 14b. In FIG. 10 the tip 16 has an even less clearly defined location with the metal contact section 16c forming but a small portion of it. In FIG. 11 contact section 16d is formed by a thin portion of the same material used in the rest of cover 12d. In each of FIGS. 8–11 it is apparent that the sealing engagement between the probe cover and probe member is not limited to contact between the probe contact section and probe member but can take place between portions of the tip not including the contact section and the probe member or between the body section and probe member.

The contact section need not be associated with any definable tip structure. For example, in FIGS. 12 and 13 where like parts have been given like numbers accompanied by lower case letters $e$ and $f$, respectively, with respect to FIG. 7, probe cover 12e has a hollow cylindrical shape which conforms to the shape of probe member 20e. Thermal chamber 120e, formed by recess 150 and probe cover 12e sealingly engaged with member 20e houses heat sensing device 130e. The contact section 16e of cover 12e is a thinwalled portion of the same material as the rest of cover 14e. Alternatively cover 12f, FIG. 13, may have a separate material for contact section 16f. In each configuration the contact section and body section are sealed to one another to ensure the integrity of the thermal chamber.

Other embodiments will occur to those skilled in the art and are within the following claims:

What is claimed is:

1. A heat sensing probe system comprising a probe member, a heat sensitive element sealingly engaged with and mounted on said probe member, separate and independent of said probe cover, and a disposable probe cover for mounting on said probe member, said probe cover including a body section and a tip including a thermally conductive contact section sealingly interconnected with said body section, said tip being contiguous to and in sealed engagement with said probe member for forming a thermal chamber, between said probe member and said contact section, by said contact section and said heat sensing element being spaced from each other and a low thermal conductivity fluid medium for transferring heat from said contact section to said heat sensitive element.

2. The heat sensing probe system of claim 1 in which said probe member includes a tube and said heat sensing element is mounted therein.

3. The heat sensing probe system of claim 1 in which said probe member includes a biasing mechanism for positively urging said probe cover into sealing engagement with said probe member to form said thermal chamber.

4. The heat sensing probe system of claim 2 in which at least one of the end of said tube which engages said probe cover and the portion of the probe cover so engaged is flexible.

5. The heat sensing probe system of claim 4 in which the portion of said probe cover which receives said end of said tube is tapered for increasing the engaging force between said probe member and said probe cover.

6. A probe cover holding mechanism comprising a housing, at least one locking element for holding a probe cover and one ejection element for ejecting a aprobe cover, an actuator slidably movable in said housing and connected to said elements, a probe member separate and independent of said probe cover and extending from said actuator forwardly, externally of said housing, a guide member for guiding said elements in their forward and rearward movements, a biasing structure for urging said actuator, and said elements rearwardly for compelling said probe cover to sealingly engage said probe member and cam means for spreading said locking elements as they move forwardly against the force of said biasing structure and retracting them as they are moved rearwardly with the force of said biasing structure.

* * * * *